(12) United States Patent
Krautter et al.

(10) Patent No.: US 8,918,254 B2
(45) Date of Patent: Dec. 23, 2014

(54) CONTROL DEVICE FOR ASSISTING A PARKING MANEUVER

(75) Inventors: Wolfgang Krautter, Leonberg (DE); Michael Scherl, Bietigheim (DE); Clemens Guenther, Ettlingen (DE); Matthias Haug, Pleidelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/998,751

(22) PCT Filed: Oct. 15, 2009

(86) PCT No.: PCT/EP2009/063459
§ 371 (c)(1),
(2), (4) Date: Jul. 14, 2011

(87) PCT Pub. No.: WO2010/060681
PCT Pub. Date: Jun. 3, 2010

(65) Prior Publication Data
US 2011/0288727 A1 Nov. 24, 2011

(30) Foreign Application Priority Data
Nov. 26, 2008 (DE) .......... 10 2008 044 073

(51) Int. Cl.
| | | |
|---|---|---|
| *G05D 1/00* | (2006.01) | |
| *B60S 9/205* | (2006.01) | |
| *B60Q 1/48* | (2006.01) | |
| *B62D 15/02* | (2006.01) | |
| *G01S 15/93* | (2006.01) | |
| *G01S 7/00* | (2006.01) | |
| *G01S 13/93* | (2006.01) | |

(52) U.S. Cl.
CPC ......... *B62D 15/027* (2013.01); *G01S 2015/935* (2013.01); *B62D 15/0285* (2013.01); *G01S 2015/939* (2013.01); *G01S 7/003* (2013.01); *G01S 2013/9314* (2013.01); *G01S 15/931* (2013.01); *B62D 15/028* (2013.01)
USPC .......................... 701/41; 180/199; 340/932.2

(58) Field of Classification Search
USPC .......... 701/41, 1, 36, 117, 301; 180/199, 204; 340/425.5, 901, 932.2
See application file for complete search history.

(56) References Cited

U.S. PATENT DOCUMENTS 6,657,555 B2 * 12/2003 Shimizu et al. ............ 340/932.2
(Continued)

FOREIGN PATENT DOCUMENTS

| DE | 102 57 722 | 7/2004 |
|---|---|---|
| DE | 10 2005 037468 | 2/2007 |
| DE | 10 2007 035219 | 1/2009 |
| EP | 1 470 958 | 10/2004 |

(Continued)

OTHER PUBLICATIONS

International Search Report for PCT/EP2009/063459 dated Feb. 4, 2010.

*Primary Examiner* — Calvin Cheung
*Assistant Examiner* — Aaron L Troost
(74) *Attorney, Agent, or Firm* — Kenyon & Kenyon LLP

(57) ABSTRACT

A control device may assist in parking maneuvers of a vehicle. The control device may include an interface to a sensor unit for detecting a boundary of a parking space in the surroundings of the vehicle. An arithmetic unit may determine a trajectory into a parking position in the parking space. In some embodiments the arithmetic unit is configured to calculate a trajectory into the parking position, taking into account a potential extension of parts of the body of the vehicle beyond the boundary of the parking space. Devices and methods are provided.

15 Claims, 3 Drawing Sheets

(56) References Cited

U.S. PATENT DOCUMENTS

| | | | |
|---|---|---|---|
| 6,676,186 B2* | 1/2004 | Greif | 296/50 |
| 7,257,486 B2* | 8/2007 | Shimazaki et al. | 701/300 |
| 7,432,490 B2* | 10/2008 | Heinemann et al. | 250/206.1 |
| 2005/0231341 A1* | 10/2005 | Shimizu | 340/436 |
| 2009/0278709 A1* | 11/2009 | Endo et al. | 340/932.2 |
| 2010/0039292 A1* | 2/2010 | Scherl et al. | 340/932.2 |

FOREIGN PATENT DOCUMENTS

| | | | |
|---|---|---|---|
| WO | WO2006/133996 | * | 12/2006 |
| WO | 2007/014595 | | 2/2007 |
| WO | EP 1764630 | * | 3/2007 |
| WO | EP 1764630 | * | 8/2007 |
| WO | WO2007/122863 A1 | * | 11/2007 |
| WO | WO 2007/122863 A1 | * | 11/2007 |

* cited by examiner

CONTROL DEVICE FOR ASSISTING A PARKING MANEUVER

FIELD OF THE INVENTION

The present invention is directed to a control device for assisting a parking maneuver and a method for assisting a parking maneuver.

BACKGROUND INFORMATION

A device and a method for assisting a parking maneuver of a vehicle is discussed in German patent document DE 10 2005 037468 A1. A sensor system is used to measure a parking space. A parking trajectory of the vehicle into the parking space is furthermore determined with the aid of an evaluation unit. Moreover, with the aid of a selection unit, a user may also select a parking trajectory from multiple different parking trajectories determined by the evaluation unit.

SUMMARY OF THE INVENTION

The control device according to the present invention for assisting a parking maneuver for a vehicle, having the features described herein, has the advantage over the related art that a parking trajectory of the vehicle into a parking space is determined by taking into account a potential extension beyond a particular boundary of a parking space. A potential extension beyond a boundary of a parking space exists when parts of the vehicle body, for example, a bumper, potentially extend beyond the detected boundary of the parking space. This may be the case, for example, if the bumper potentially extends beyond a curb or a low wall. In this case, the area above the boundary of the parking space may also be used for the parking maneuver due to the fact that a corresponding area of the vehicle rear or the vehicle front may be guided over and beyond the boundary of the parking space. If the boundary of the parking space is formed, for example, by a high wall, a potential extension beyond the boundary does not exist, since the body of the vehicle must maintain a distance from the wall. In this case, the area above the parking space cannot be taken into account for guiding the vehicle rear or the vehicle front during the parking maneuver. Also in the area of outer vehicle body parts, for example an external mirror or a bumper, the vehicle must rather be guided during the parking maneuver while always maintaining a distance from the boundary of the parking space, possibly including a safety distance.

If a potential extension beyond the boundary of the parking space exists, the parking maneuver may be more easily performed, taking this potential extension beyond the boundary into account, namely by also using the space above the boundary of the parking space by a corresponding extension of parts of the vehicle body beyond the boundary. If a potential extension beyond the boundary does not exist, this space may not be used. In this case, additional parking maneuvers may be necessary or a parking space may be unsuitable for parking. By being able to detect or input a potential extension beyond a boundary of a parking space, an otherwise unsuitable parking space may, if necessary, be used for a parking maneuver. If necessary, the parking trajectory may furthermore be shortened or simplified. By taking into account a potential extension beyond the boundary, a parking maneuver may be speeded up or, as the case may be, may be carried out in the first place.

Similar advantages also arise for a method for assisting a parking maneuver for a vehicle according to the other independent patent claim.

The measures described in the independent claims provide advantageous refinements of and improvements on the control device described and specified herein and the method described and specified herein. Thus, it is advantageous that the control device has an interface to an input unit which a user may use to input a potential extension beyond at least one boundary of the parking space. Even if a sensor for detecting a boundary of a parking space is unable to detect whether a potential extension beyond an obstacle exists, a user may manually input this potential extension if he/she identifies a potential extension, for example a potential extension beyond a curb.

It is furthermore advantageous to provide an interface for a display to present a parking space to the user and to also show the user which boundaries have been detected or input as being potentially transgressible. A user may thus determine whether a corresponding identification of a parking space boundary with regard to a potential extension beyond the boundary is or is not applicable. This ensures that a user receives a confirmation for a parking maneuver as to whether the control device for assisting the parking maneuver has correctly identified a parking space as being one in which a part of the body of the vehicle may extend beyond the boundary and has taken this into account for calculating a trajectory into a parking position in a parking space.

It is furthermore advantageous to provide an interface to an input unit for choosing between a calculated trajectory having boundaries which are assumed to be potentially transgressible and a calculated trajectory having boundaries which are assumed to be nontransgressible. This makes it possible to select particularly quickly from among trajectories resulting from varying potential extensions beyond the boundaries.

It is furthermore advantageous to provide an interface for outputting driving instructions for at least partial automatic steering of the vehicle, for example, automatically activating a steering for the purpose of automatically guiding the vehicle into the desired parking position in the parking space.

It is furthermore advantageous to select a parking position in the parking space in such a way that the distance of the parking position from a boundary of the parking space depends on whether a particular boundary of the parking space is potentially transgressible. For example, if the vehicle is positioned in a parking space adjacent to a high wall, a greater distance is maintained. As a result, a person who must exit the vehicle on that particular side of the vehicle is able to comfortably exit the vehicle. Furthermore, it is also possible to enable a person comfortably to open a trunk lid. If the respective boundary is potentially transgressible, for example the edge of a curb, the parking position may be placed very close to the boundary of the parking space, since this generally makes it possible to also easily open the doors or access a trunk over the potentially transgressible parking space boundary.

It is furthermore advantageous to make a potential extension of parts of the vehicle body dependent on whether the particular boundary of the parking space does not exceed a predefined height above a driving surface of the vehicle. The corresponding limiting height is predefined by the dimensions of the vehicle. If the vehicle's center of gravity is lowered, for example, a relevant limiting height may be adjusted, for example to a lowered front or rear apron of the vehicle. If the vehicle is designed, for example, as an off-road vehicle, a corresponding potential extension may be set higher. After a limiting height has been established, a, in particular, subsequent automatic determination of a potential extension is easily possible.

Exemplary embodiments of the present invention are illustrated in the drawings and explained in greater detail in the following description.

DETAILED DESCRIPTION

Figure 1:
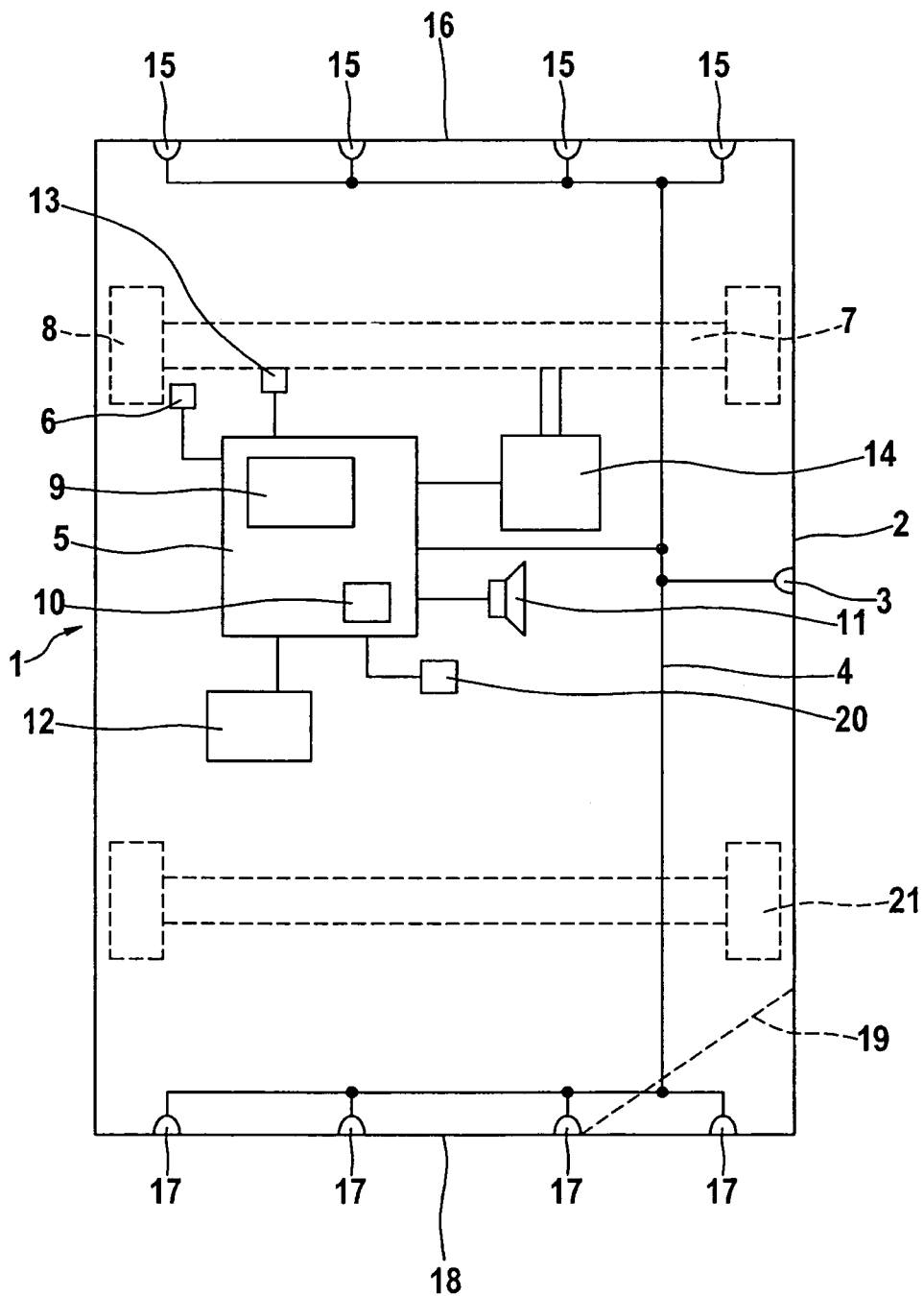
FIG. 1 shows a schematic representation of a vehicle having a control device according to the present invention for assisting a parking maneuver.

FIG. 1 shows a motor vehicle 1 which has a distance sensor 3 on its right vehicle side 2, the distance sensor being designed to measure a parking space when vehicle 1 passes along the parking space. Corresponding measuring results of sensor 3 are supplied to a control device 5 via a data interface 4. Distance sensor 3 is designed, for example, as an ultrasonic distance sensor. Control device 5 is furthermore connected to a path sensor 6 which is situated, for example, adjacent to a front axle 7 of vehicle 1. Path sensor 6 measures a distance traveled by wheel 8 of the vehicle, while distance sensor 3 measures distances to lateral obstacles on right vehicle side 2. This makes it possible to ascertain a map of the surroundings on right vehicle side 2 of vehicle 1. In particular, it is possible to check whether a parking space which is adequate for parking by vehicle 1 is located on right vehicle side 2. To locate an appropriate parking space, an arithmetic unit 9 of control device 5 compares the measured width and/or length of the parking space with vehicle data stored in a memory 10 of control device 5. Based on a current position of the vehicle, control device 5 calculates a trajectory of the vehicle into a parking position in the parking space with the aid of arithmetic unit 9. In a first specific embodiment, driving instructions are output to a driver of vehicle 1 via a speaker 11 and/or via a display 12. In a further specific embodiment, a steering device 13 of the vehicle may also be activated in such a way that the vehicle is automatically guided into the parking space. In a further specific embodiment, control device 5 may also be connected to a drive unit 14 of the vehicle to also automatically guide the vehicle into the parking space. During the parking maneuver, the trajectory in front of or behind the vehicle is monitored via distance sensors 15 on a front 16 of the vehicle and/or via distances sensors 17 on a rear 18 of the vehicle.

In a first specific embodiment, distance sensor 3 is designed to detect only boundaries of a parking space. Accordingly, a curb which delimits a course of the road is regarded as a boundary of a parking space. In particular, in the event that the vehicle is to be backed into a parking space which runs parallel to a direction of vehicle travel, it may be advantageous, however, if a rear area of the vehicle extends beyond the parking space boundary formed by the curb. A corresponding rear area is identified by a broken line 19 in FIG. 1. In one specific embodiment, a user may now input with the aid of an input unit 20 that the right longitudinal boundary of the parking space is a potentially transgressible boundary. Correspondingly, this may now be taken into account by arithmetic unit 9 in planning the trajectory, and the fact that the area of vehicle 1 delimited by broken line 19 may extend beyond the detected boundary of the parking space is taken into account. However, right rear wheel 21 may not reach the boundary of the parking space, for example to prevent damage to tire 21 due to contact with the curb. If a potential extension beyond the parking space boundaries does not exist, the trajectory of vehicle 1 into the parking space is calculated in such a way that a predefined minimum distance from all sides of the vehicle to the detected boundaries of the parking space is maintained, this minimum distance being largely predetermined by the measurement uncertainties of distance sensor 3 or distance sensors 15, 17 and amounting to, for example, 5 cm to 20 cm.

Instead of a curb, any other potentially transgressible parking space boundaries may be input as being potentially transgressible. For example, these may be markings which are merely applied to a road surface. In particular, when detecting a parking space boundary via a distance sensor 3 designed as a video sensor, such a boundary, which may be driven over without any problems, may possibly be considered to be restrictive when planning the parking trajectory into the parking position.

In a further specific embodiment, distance sensor 3 may also be designed to measure the particular heights of parking space boundaries, for example, using a suitable measuring method. By comparing the measured height with a height stored in memory 10 of control device 5, it may be determined whether or not the particular parking space boundary may be classified as potentially transgressible. For this purpose, an appropriate vehicle-specific height is stored in memory 10.

If necessary, a warning may also be output via speaker 11 and/or via display 12 when a user classifies a parking space boundary as being potentially transgressible, while, however, distance sensors 3, 15, 17 of vehicle 1 are unable to detect a corresponding potential extension.

Figure 2:
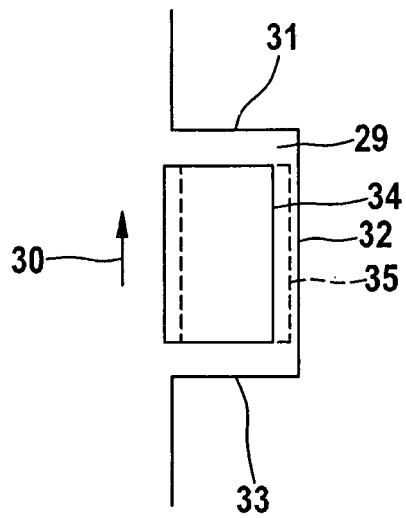
FIG. 2 shows a parking situation to illustrate the method according to the present invention for assisting a parking maneuver.

FIG. 2 shows a first exemplary embodiment of possible parking positions in a parking space 29. Parking space 29, which is oriented parallel to a direction of travel 30, is limited by a front boundary 31, by a lateral boundary 32 and by a rear boundary 33. If all three boundaries are classified as being nontransgressible, the vehicle is guided into a parking position 34, in which the vehicle has a minimum distance to parking space boundaries 31, 32, 33 during the parking maneuver. Furthermore, parking position 34 is selected in such a way that a minimum distance to parking space boundaries 31, 32, 33 is maintained in each case even after the vehicle has been parked. A further parking position 35 is also represented by the broken lines. The distance relative to right parking space boundary 32 is reduced in parking position 35. In this case, only lateral parking space boundary 32 has been input or detected as being potentially transgressible. The distance of parking position 35 to right parking space boundary 32 is reduced in relation to parking position 34.

Figure 3:
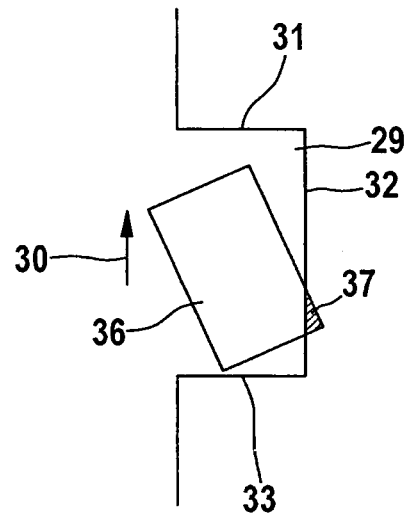
FIG. 3 shows a different parking situation to illustrate the method according to the present invention for assisting a parking maneuver.

FIG. 3 shows an example of a method for carrying out a parking maneuver of a vehicle 36 into parking space 29. Similar to the situation associated with parking position 35 in FIG. 2, lateral parking space boundary 32 is designed as a potentially transgressible parking space boundary. In this case, vehicle 36 could be driven into parking space 29 in such a way that a right rear corner 37, represented by the hatched area, may extend beyond right parking space boundary 32 during the parking maneuver.

Figure 4:
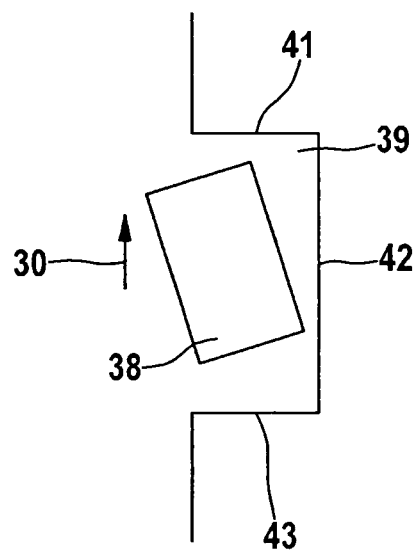
FIG. 4 shows a different parking situation to illustrate the method according to the present invention for assisting a parking maneuver.

FIG. 4 shows an alternative situation, in which a vehicle 38 is driven into a larger parking space 39. A front parking space boundary 41, a lateral parking space boundary 42 and a rear parking space boundary 43 are also provided, all of which cannot be driven over. Thus, front and rear parking space boundaries 41, 43 may be formed, for example, by vehicles. Lateral parking space boundary 42 is formed, for example, by a house wall. Vehicle 38 is now unable to use the area beyond parking space boundaries 41, 42, 43 for a parking maneuver. Therefore, vehicle 38 must be guided into parking space 39 without coming into contact with parking space boundaries 41, 42, 43. Parking space 39 must therefore be larger than parking space 29, in which the particular lateral parking space boundaries may be crossed.

Figure 5:
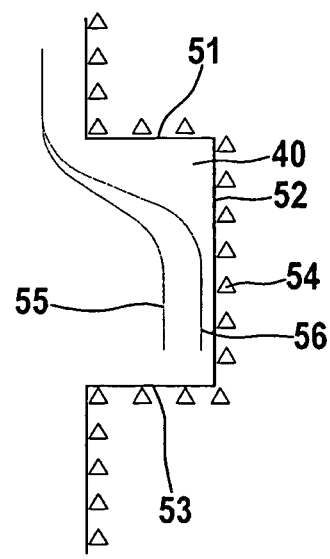
FIG. 5 shows an exemplary embodiment of a display presentation for carrying out the method according to the present invention for assisting a parking maneuver.

A first exemplary embodiment of a display representation is illustrated in FIG. 5. A parking space 40, which is delimited by parking space boundaries on front 51, on longitudinal side 52 and on rear 53, is shown on the display. Particular parking space boundaries 51, 52, 53 are each nontransgressible. Reference is hereby made to symbols 54 shown along the parking space boundaries. In a further specific embodiment, a first parking trajectory 55 and a second parking trajectory 56 may be shown in the display representation. First parking trajectory 55 corresponds to the situation that none of the parking space boundaries is potentially transgressible. Second parking trajectory 56 corresponds to the situation in which lateral parking space boundary 52 is potentially transgressible. A user may now check whether lateral parking space boundary 52 is, in fact, nontransgressible. If this boundary is potentially transgressible, the vehicle may select second parking trajectory 56, symbols 54 on lateral parking space boundary 52 then also being modified accordingly on the display.

According to the exemplary embodiment in FIG. 5, the two parking trajectories 55, 56 are displayed simultaneously. However, it is also possible to display first one parking trajectory and then, after the driver makes a selection, to show another parking trajectory on a display.

If both parking trajectories 55, 56 are possible, the question of whether a lateral parking space boundary is potentially transgressible is not decisive for the success of the parking maneuver. However, if the length of the parking space is not sufficient, a parking maneuver may be successfully completed only if the lateral parking space boundary is potentially transgressible.

In one specific embodiment, each boundary is first assumed to be nontransgressible, i.e., the situation according to FIG. 5 is presented to the driver, for example, on the display. According to this specific embodiment, a potentially transgressible parking space boundary is assumed only if the driver has confirmed a potential extension beyond the particular parking space boundary.

A potential extension beyond, for example, front or rear parking space boundary 52, 53 may also be reasonably taken into account. Thus, the vehicle front or the vehicle rear may be moved farther forward or backward, in the event that the front or rear parking space boundary is potentially transgressible, for the purpose of guiding the vehicle into a suitable parking position in the parking space, in particular in the event of multiple parking maneuvers.

Figure 6:
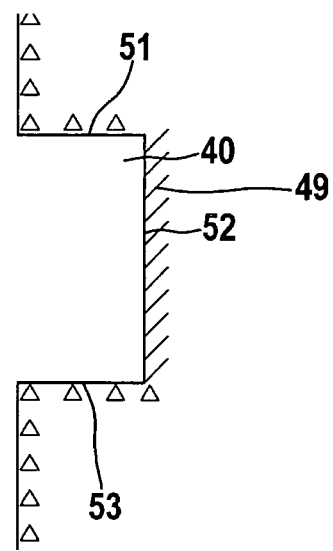
FIG. 6 shows another exemplary embodiment of a display presentation for carrying out the method according to the present invention for assisting a parking maneuver.

FIG. 6 shows an alternative display representation in which parking space 40 is also shown. Likewise, nontransgressible parking space boundaries 51 and 53 are also displayed. Lateral parking space boundary 52 is now identified by a corresponding symbol 49 as a parking space boundary able to be driven over. An observer may now recognize that a potential extension beyond right parking space boundary 52 is assumed during a parking maneuver controlled by the control device.

What is claimed is:

1. An apparatus for assisting a parking maneuver for a vehicle, comprising:
    an interface to a sensor for detecting at least one boundary of a parking space in surroundings of the vehicle and a height of the at least one boundary;
    a display for displaying the at least one boundary of the parking space;
    a control device adapted to determine that the at least one boundary is transgressible or not transgressible, wherein the at least one boundary is transgressible when a vehicle component has a clearance exceeding that of the at least one boundary based on a comparison of the at least one boundary height to a stored vehicle-specific height, and wherein the at least one boundary is adapted to be identified on the display as transgressible or not transgressible; and
    a user input to input that the at least one boundary is transgressible when the at least one boundary is identified as not transgressible;
    wherein the control device is adapted to calculate a trajectory into a parking position in the parking space such that the calculated trajectory into the parking position takes into account whether the at least one boundary is transgressible while preventing wheels of the vehicle from transgressing the boundary.

2. The control device of claim 1, wherein the display displays the at least one boundary of the parking space being identified to determine whether the vehicle extends beyond the at least one boundary.

3. The control device of claim 1, wherein the user input selects between a determined trajectory into a parking space having at least one boundary which is assumed to be transgressible, and a determined trajectory into the parking space having at least one boundary which is assumed to be not transgressible.

4. The control device of claim 1, further comprising:
    an output interface for outputting driving instructions for at least partial automatic steering of the vehicle into the parking space.

5. The control device of claim 1, wherein the control device determines the at least one boundary to be transgressible when the boundary height is less than the stored vehicle-specific height and a driver has confirmed that the at least one boundary is transgressible.

6. The control device of claim 1, wherein the control device is configured to determine a first trajectory in which the at least one boundary is treated as not transgressible and a second trajectory in which the at least one boundary is treated as transgressible and the user is able to select either of the trajectories when the boundary is determined to be transgressible.

7. The control device of claim 1, wherein the at least one boundary is a surface of a fixed structure and the vehicle component is a trunk.

8. The control device of claim 1, wherein the vehicle component is a door.

9. The control device of claim 1, wherein the vehicle component is at least one of a front and a rear apron of the vehicle.

10. The control device of claim 1, wherein via the display a user determines whether the at least one boundary is transgressible.

11. A method for assisting a parking maneuver for a vehicle, the method comprising:
- detecting at least one boundary of a parking space in surroundings of the vehicle and a height of the at least one boundary;
- displaying by a display interface the at least one boundary;
- determining, by a control device, that the at least one boundary is transgressible or not transgressible, wherein the at least one boundary is transgressible when a vehicle component has a clearance exceeding that of the at least one boundary based on a comparison of the at least one boundary height to a stored vehicle-specific height;
- identifying the at least one boundary on the display as transgressible or not transgressible;
- inputting by a user input that the at least one boundary is transgressible when the at least one boundary is identified as not transgressible; and
- calculating, by the control device, a trajectory into a parking position in the parking space, wherein the trajectory into the parking space is calculated by taking into account whether the at least one boundary is transgressible while preventing wheels of the vehicle from transgressing the boundary.

12. The method of claim 11, further comprising selecting a parking position in the parking space based on the distance of the parking position from the at least one boundary of the parking space and whether the at least one boundary is transgressible.

13. The method of claim 11, whether the at least one boundary is transgressible is determined from a user input or from measured variables.

14. The method of claim 11, wherein the at least one boundary of the parking space is shown on the display and whether the at least one boundary is transgressible.

15. The method of claim 11, wherein the at least one boundary is transgressible if the at least one boundary of the parking space does not exceed a specified height above a driving surface of the vehicle.

* * * * *